United States Patent
Xu et al.

(10) Patent No.: US 12,431,013 B2
(45) Date of Patent: Sep. 30, 2025

(54) SHORT-TERM TRAFFIC FLOW PREDICTION METHOD BASED ON CAUSAL GATED-LOW-PASS GRAPH CONVOLUTIONAL NETWORK

(71) Applicant: Zhejiang University of Science and Technology, Hangzhou (CN)

(72) Inventors: Xing Xu, Hangzhou (CN); Hao Mao, Hangzhou (CN); Yun Zhao, Hangzhou (CN)

(73) Assignee: ZHEJIANG UNIVERSITY OF SCIENCE AND TECHNOLOGY, Hangzhou (CN)

( * ) Notice: Subject to any disclaimer, the term of this patent is extended or adjusted under 35 U.S.C. 154(b) by 300 days.

(21) Appl. No.: 18/350,347

(22) Filed: Jul. 11, 2023

(65) Prior Publication Data

US 2024/0029556 A1    Jan. 25, 2024

(30) Foreign Application Priority Data

Jul. 20, 2022    (CN) .......................... 202210858553.5

(51) Int. Cl.
*G08G 1/01*     (2006.01)
*G06N 3/04*     (2023.01)

(52) U.S. Cl.
CPC ............ *G08G 1/0133* (2013.01); *G06N 3/04* (2013.01); *G08G 1/0129* (2013.01); *G08G 1/0145* (2013.01)

(58) Field of Classification Search
CPC ...... G08G 1/01; G08G 1/0133; G08G 1/1029; G08G 1/0145; G08G 3/04; G06N 3/04
USPC .......................................................... 701/118
See application file for complete search history.

(56) References Cited

U.S. PATENT DOCUMENTS

| | | | | |
|---|---|---|---|---|
| 11,458,987 B2 * | 10/2022 | Li | .......................... | G06N 3/044 |
| 11,972,606 B2 * | 4/2024 | Bai | ......................... | G01S 17/931 |
| 11,979,328 B1 * | 5/2024 | Zhang | ....................... | G06N 3/04 |
| 2022/0214457 A1 * | 7/2022 | Liang | ....................... | G06N 3/04 |
| 2024/0395064 A1 * | 11/2024 | Ali | ......................... | G06F 18/251 |

* cited by examiner

*Primary Examiner* — Andrew Joseph Rudy
(74) *Attorney, Agent, or Firm* — Mark T. Vogelbacker; Eckert Seamans Cherin & Mellott, LLC

(57) ABSTRACT

A short-term traffic flow prediction method based on a causal gated-low-pass graph convolutional network can include constructing a causal gated-low-pass graph convolutional network, where the causal gated-low-pass graph convolutional network includes a causal gated-low-pass convolutional block. The causal gated-low-pass convolutional block is connected to a fully-connected output layer, the causal gated-low-pass convolutional block includes two causal gated linear units and a low-pass graph convolutional block, and the low-pass graph convolutional block is set between the causal gated linear units. The method can further include obtaining a traffic flow network diagram and a traffic flow value based on traffic flow data, using the traffic flow network diagram as input, and performing short-term traffic flow prediction by using the causal gated-low-pass graph convolutional network. The method can predict short-term traffic flow with high accuracy.

6 Claims, 12 Drawing Sheets

SHORT-TERM TRAFFIC FLOW PREDICTION METHOD BASED ON CAUSAL GATED-LOW-PASS GRAPH CONVOLUTIONAL NETWORK

CROSS REFERENCE TO RELATED APPLICATION

This patent application claims the benefit and priority of Chinese Patent Application Ser. No. 202210858553.5, filed with the China National Intellectual Property Administration on Jul. 20, 2022, the disclosure of which is incorporated by reference herein in its entirety as part of the present application.

TECHNICAL FIELD

The present disclosure relates to the technical field of traffic flow prediction, and in particular, to a short-term traffic flow prediction method based on a causal gated-low-pass graph convolutional network.

BACKGROUND

The research on traffic control and guidance system is a hot topic in the field of intelligent transportation system, the core of which is to accurately identify the ever-changing road traffic status. One of the key technologies for accurate identification is the study of short-time traffic flow prediction. Unlike the macro sense of hourly, weekly, daily, or even annual traffic flow prediction, short-time traffic flow prediction is in the micro sense, which is mainly based on the historical information of road traffic flow, using appropriate methods to predict the future short-time traffic conditions. This provides effective reference for balancing road network traffic flow, optimizing traffic management schemes, and improving traffic control. At present, the neural network plays an increasingly important role in the field of traffic flow prediction. It carries out traffic flow prediction accurately and efficiently through convolution, without needing a deep mathematical model. However, there are still some problems. For example, traffic data is a combination of temporal data and spatial data, a long short-time memory network (LSTM) is too redundant for feature extraction of temporal data, and time-consuming calculation is not conducive to the real-time requirements of short-term prediction. In graph convolution, Chebyshev polynomials are used as convolution kernels to extract spatial features of spatial data, which amplifies a proportion of high-frequency data in overall data, while spatial features of traffic data are mostly low-frequency features, therefore, the foregoing manner affects the prediction accuracy in a convolution process. Therefore, how to further perform short-term traffic flow prediction based on the existing neural network becomes a technical problem to be resolved by applicants.

SUMMARY

The object of the present disclosure is to provide a short-term traffic flow prediction method based on a causal gated-low-pass graph convolutional network. The present disclosure can predict short-term traffic flow with high accuracy.

A technical solution in the present disclosure: a short-term traffic flow prediction method based on a causal gated-low-pass graph convolutional network, including the following steps:

S1: constructing a causal gated-low-pass graph convolutional network, where the causal gated-low-pass graph convolutional network includes a causal gated-low-pass convolutional block, the causal gated-low-pass convolutional block is connected to a fully-connected output layer, the causal gated-low-pass convolutional block includes two causal gated linear units and a low-pass graph convolutional block with a low-pass filter, and the low-pass graph convolutional block is set between the causal gated linear units; and S2: obtaining a traffic flow network diagram based on traffic flow data, using the traffic flow network diagram as input, capturing a temporal feature of the traffic flow network diagram by using the causal gated linear unit, capturing a spatial feature in the traffic flow network diagram by using the low-pass graph convolution block, suppressing high-frequency information and enhancing low-frequency information in the spatial feature by using the low-pass filter, then fusing the temporal feature and the spatial feature, and then outputting a prediction result by using the fully-connected layer.

In the short-term traffic flow prediction method based on a causal gated-low-pass graph convolutional network, the causal gated linear unit consists of causal convolution, dilated convolution, and residual connection; the causal convolution is responsible for extracting a temporal feature, and performing convolution by using a one-dimensional convolution kernel, a size of the convolution kernel is 3, and each convolution stride is 1; the dilated convolution is a convolution manner with a stride of at least 2, which improves a convolution receptive field greatly with a very small data length by using a plurality of hidden layers, and reduces temporal consumption of causal convolution; and the residual connection is used to alleviate a gradient vanishing problem and avoid a redundant calculation process.

In the short-term traffic flow prediction method based on a causal gated-low-pass graph convolutional network, the causal gated linear unit captures the temporal feature by exploring a $k_t$ order neighborhood of each node on a traffic flow network diagram G, each convolution shortens a temporal length of $k_t-1$, i node data is regarded as data $Y \in \mathbb{R}^{N \times \tau \times C_i}$ with a slice temporal length of $\tau$ and a channel quantity of $C_i$, and the convolution kernel is defined as $\Gamma \in \mathbb{R}^{1 \times C_i \times 2C_0}$; and a first causal gated linear unit performs one-dimensional causal convolution, a second causal gated linear unit performs one-dimensional causal convolution and then performs a nonlinear change, data output of the two parts is recorded as $[P, Q] \in \mathbb{R}^{N \times (M-k_t+1) \times 2C_0}$, and finally hadamard product is performed on the data of the two parts, to obtain convolution of the causal gated linear unit:

$$\Gamma *_f Y = P \odot \text{sigmoid}(Q) \in \mathbb{R}^{N \times (\tau - k_t + 1) \times C_0},$$

where $\mathbb{R}$ is a matrix; N is that data is split into N parts; $C_0$ is a traffic flow feature dimension; and f is low-pass filtering.

In the short-term traffic flow prediction method based on a causal gated-low-pass graph convolutional network, the traffic flow network diagram is defined as an undirected graph:

$$G_t = \{V_t, E, A\},$$

where $G_t$ indicates a traffic flow network diagram at a moment t, $V_t$ indicates a set of nodes of $|V|=n$ at the moment t, E is a set of edges, which indicates connectivity between nodes; $A \in \mathbb{R}^{n \times n}$ is an adjacency matrix, and $A_{i,j}=A_{j,i}$ defines a connection between a node i and a node j; and $x_t^{c,i} \in R$ is used to indicate a value of a feature $C_t$ of the node i at the moment t, $c_t \in (f_t, o_t, s_t)$, and $x_t^i \in \mathbb{R}^T$ indicates values of all features of the node i at the moment t; $f_t$ indicates a traffic flow feature at the moment t on the traffic flow network diagram G; $X_t=(x_t^1, x_t^2, \ldots, x_t^n)^T \in \mathbb{R}^{N \times C}$ indicates values of all features of all nodes at the moment t, $X=(X_1, X_2, \ldots, X_T)^T \in \mathbb{R}^{T \times N \times C}$ indicates values of all features of all nodes on a temporal slice $\tau$; $O_t$ is traffic occupancy at the moment t, and $S_t$ is a vehicle speed at the moment t; and $y_t^i = x_t^{f,i}$ is a traffic flow value of any node i at any future moment t.

In the short-term traffic flow prediction method based on a causal gated-low-pass graph convolutional network, the low-pass graph convolutional block increases a weight of a low-frequency signal and suppresses a high-frequency signal by using a low-pass filter, and the low-pass filter is defined as:

$$f(\lambda_i) = 1 - \frac{1}{2}\lambda_i,$$

where $\lambda_i$ is an $i^{th}$ feature value;

a graph convolution operation of the low-pass graph convolutional block is:

$$x *_G g_\theta =$$

$$U \sum_{k=0}^{k-1} \theta_k (\Lambda_s)^k U^T x = \left\{\theta_0 I + \theta_1 \left(\left(1 - \frac{1}{2}\lambda_1\right)\overline{u_1 u_1}^T + \ldots \left(1 - \frac{1}{2}\lambda_n\right)\overline{u_n u_n}^T + \ldots + \theta_{k-1}\left(\left(1 - \frac{1}{2}\lambda_1^{k-1}\right)\overline{u_1 u_1}^T + \ldots + \left(1 - \frac{1}{2}\lambda_n\right)^{k-1}\overline{u_n u_n}^T\right)\right\} x =$$

$$\theta_0 I + \theta_1 \left(I - \frac{1}{2}L\right) + \ldots + \theta_{k-1}\left(I - \frac{1}{2}L\right)^{k-1},$$

where $$\Lambda_s = \text{diag}\left(\left\{1 - \frac{1}{2}\lambda_i\right\}_{i=1}^n\right)$$

indicates a diagonal matrix filtered by the low-pass filter, a convolution kernel of graph convolution is $g_\theta = \Sigma_{k=0}^{k-1} \theta_k (A_y)^k$; $u_1 u_1^T = 1$, $\overline{u_1 u_1}^T = 0$, $i \neq j$, $(\overline{u_1}, \ldots, \overline{u_n}) = U$ and U indicates eigenvectors of a Laplacian matrix; $\theta \in R^k$ is a coefficient of a polynomial; k is a size of a graph convolution kernel; x is a flow signal on the traffic flow network diagram G; L is the Laplacian matrix, $L=D-A$, $D \in \mathbb{R}^{N \times N}$ is a diagonal matrix indicating a sum of weights of all edges starting from the node i; and I is a constant, and A is an adjacency matrix.

In the short-term traffic flow prediction method based on a causal gated-low-pass graph convolutional network, after feature extraction and fusion by the causal gated-low-pass convolution block, a temporal-spatial feature is $x_{t+1} \in \mathbb{R}^{(\tau - k_t + 1) \times N \times C_t}$ and the prediction result output by the fully-connected layer is:

out=Relu($\Gamma_1 *_f$(Relu(($\Gamma_0 *_f x_t) *_G g_\theta$))), where $\Gamma_0$ is a convolutional kernel of a convolution module of the first causal gated linear unit; $\Gamma_1$ is a convolutional kernel of a convolution module of the second causal gated linear unit; $g_\theta$ is a convolution kernel of the low-pass graph convolutional block, and Relu is an activation function of the low-pass graph convolutional block and the fully-connected layer; *f indicates an operation of the causal gated linear unit, and *G indicates an operation of the low-pass graph convolutional block.

Compared with the conventional technology, the present disclosure forms a prediction model by using the causal gated-low-pass convolution block and the fully-connected output layer, captures the spatial feature in the traffic flow network diagram by using the graph convolutional block, and at the same time, in order to avoid influence of the high weight of the high-frequency information, the low-pass filter that can both suppress the high-frequency information and enhance the low-frequency information is added to graph convolution, so that a signal on the entire graph is smoother and more robust. Meanwhile, in order to resolve inherent defects of a recurrent network, the present disclosure uses the causal gated linear unit on a temporal axis to capture a temporal feature, and here use of LSTM is avoided, which speeds up training and improves efficiency. Finally, the two parts are combined to extract the temporal and spatial features together. Therefore, the present disclosure can predict short-term traffic flow with high accuracy. In addition, the causal convolution of the causal gated linear unit of the present disclosure is responsible for extracting a temporal feature; the dilated convolution improves a convolution receptive field greatly with a very small data length by using a plurality of hidden layers, and reduces temporal consumption of causal convolution; and the residual connection is used to alleviate a gradient vanishing problem and avoid a redundant calculation process. The method greatly reduces duration of calculation on the basis of preserving prediction accuracy to the maximum extent, and avoids a redundant calculation process of the long and short-term memory network.

DETAILED DESCRIPTION OF THE EMBODIMENTS

The present disclosure is further described below with reference to drawings and embodiments, but the present disclosure is not limited thereto.

Figure 1:
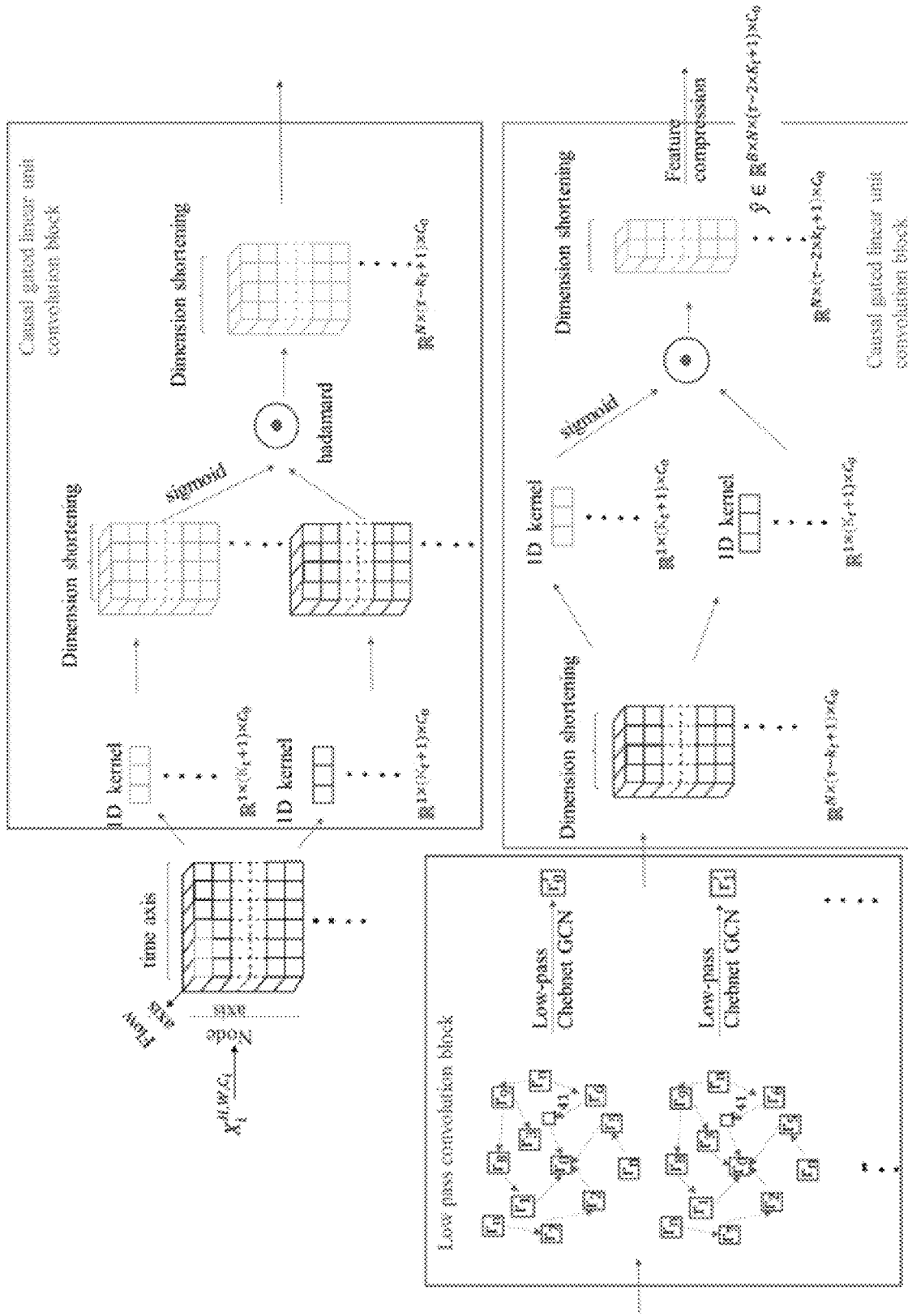
FIG. 1 is a schematic diagram of a causal gated-low-pass graph convolutional network of the present disclosure.

Embodiment: a short-term traffic flow prediction method based on a causal gated-low-pass graph convolutional network, as shown in FIG. 1, includes the following steps:

S1: Construct a causal gated-low-pass graph convolutional network, where the causal gated-low-pass graph convolutional network includes a causal gated-low-pass convolutional block, the causal gated-low-pass convolutional block is connected to a fully-connected output layer, the causal gated-low-pass convolutional block includes two causal gated linear units and a low-pass graph convolutional block with a low-pass filter, and the low-pass graph convolutional block is set between the causal gated linear units; and as shown in FIG. 1, in the short-term traffic flow prediction method based on a causal gated-low-pass graph convolutional network, the causal gated linear unit consists of causal convolution, dilated convolution, and residual connection; the causal convolution is responsible for extracting a temporal feature, and performing convolution by using a one-dimensional convolution kernel, a size of the convolution kernel is 2, and each convolution stride is 1; the dilated convolution is a convolution manner with a stride of at least 2, which improves a convolution receptive field greatly with a very small data length by using a plurality of hidden layers, and reduces time consumption of causal convolution; and the residual connection is used to alleviate a gradient vanishing problem and avoid a redundant calculation process.

S2: Obtain a traffic flow network diagram based on traffic flow data, use the traffic flow network diagram as input, capture a temporal feature of the traffic flow network diagram by using the causal gated linear unit, capture a spatial feature in the traffic flow network diagram by using the low-pass graph convolution block, suppress high-frequency information and enhance low-frequency information in the spatial feature by using the low-pass filter, then fuse the temporal feature and the spatial feature, and then output a prediction result by using the fully-connected layer.

Figure 2:
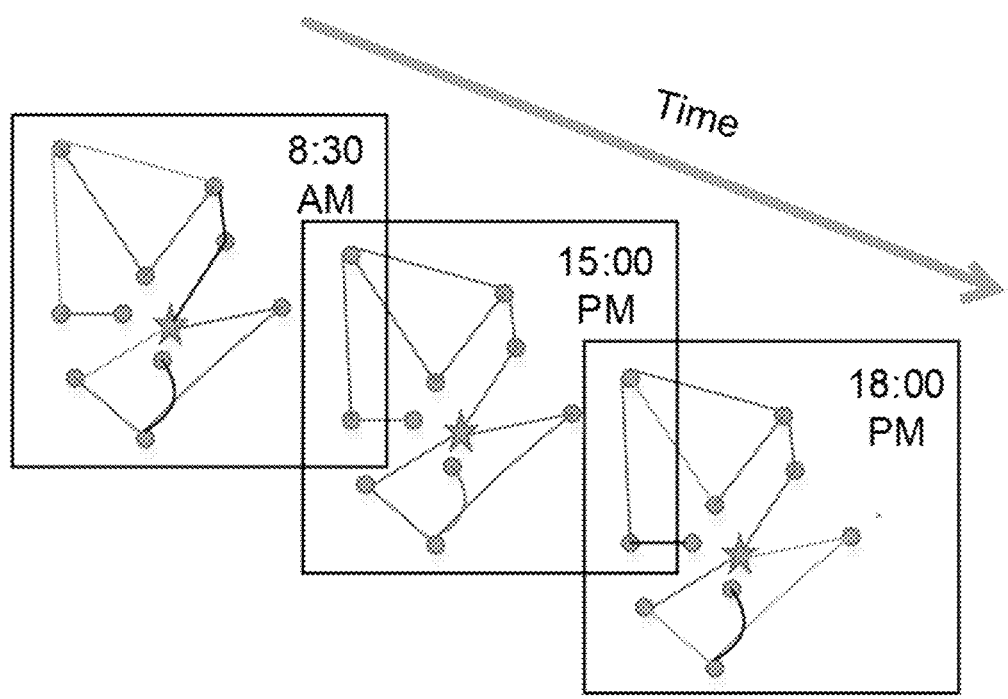
FIG. 2 is a schematic diagram of a traffic flow network diagram.

The following is a specific description of this embodiment: In this embodiment, the traffic flow data is used to reflect an index of congestion at an intersection. The traffic flow network diagram is obtained by using the traffic flow data, and the traffic flow network diagram is defined as an undirected graph:

$$G_t = \{V_t, E, A\},$$

where $G_t$ indicates a traffic flow network diagram at a moment t, $V_t$ indicates a set of nodes of $|V|=n$ at the moment t, E is a set of edges, which indicates connectivity between nodes;

$A \in \mathbb{R}^{n \times n}$ is an adjacency matrix, and $A_{i,j}=A_{j,i}$ defines a connection between a node i and a node j; and $x_t^{c,i} \in R$ is used to indicate a value of a feature $C_t$ of the node i at the moment t, $C_t \in (f_t, o_t, s_t)$, and $x_t^i \in \mathbb{R}^T$ indicates values of all features of the node i at the moment t; $f_t$ indicates a traffic flow feature at the moment t on the traffic flow network diagram G; $X_t = (x_t^1, x_t^2, \ldots, x_t^n)^T \in \mathbb{R}^{N \times C}$ indicates values of all features of all nodes at the moment t, $X = (X_1, X_2, \ldots, X_T)^T \in \mathbb{R}^{T \times N \times C}$ indicates values of all features of all nodes on a temporal slice $\tau$; $o_t$ is traffic occupancy at the moment t, and $s_t$ is a vehicle speed at the moment t; and $y_t^i = x_t^{f,i}$ is a traffic flow value of any node i at any future moment t. In FIG. 2, a dot indicates a road node, a star indicates a central road node of interest, a connection indicates congestion, and red, yellow, and green represent three types of road conditions: congestion, normal, and clear.

Since a traffic network is often an irregular graph, even if an intersection is compared to a vertex, a road is compared to an edge, and a road network is regarded as a graph of points and edges, the traffic network cannot be completely regarded as a grid, because distances between intersections are of different lengths, and viewing the road network as a grid ignores a spatial relationship between intersections. Spatial domain information captured in this way through convolution is not reasonable, so the present disclosure introduces a scheme of graph convolution, which defines convolution directly on graph data, to capture features that have different weight effects on an intersection. Graph convolution introduces a Laplacian matrix to complete Fourier transform. The Laplacian matrix is defined as L=D−A, $D \in \mathbb{R}^{N \times N}$ is a diagonal matrix representing a sum of weights of all edges from a node i, $D_{ii} = \Sigma j A_{i,j}$, and a normalized Laplacian matrix is defined as $L = I_n - D^{-1/2} A D^{-1/2}$. Eigenvalue decomposition of the Laplacian matrix is $L = U \Lambda U^T$, where $U = (\overline{u}_1, \ldots, \overline{u}_n)$ is an eigenvector of the Laplacian matrix, and the diagonal matrix $\Lambda = \text{diag}([\lambda_1, \ldots, \lambda_n]) \in \mathbb{R}^{N \times N}$ is composed of eigenvalues of the Laplacian matrix. Taking a flow at time t as an example, a flow signal defined on a graph is $x = x_t^f \in \mathbb{R}^N$, and that Fourier transform transforms the flow signal from a spatial domain to a spectral domain and is defined as $\hat{x} = U^T x \in \mathbb{R}^N (\hat{x}(\lambda_1), \ldots, \hat{x}(\lambda_n))$. Finally, the flow signal returns from the spectral domain to the spatial domain. Because U is an orthogonal matrix, inverse Fourier transform is defined as $x = U\hat{x}$. Graph convolution is a convolution calculation, and implements a convolution operation by using a diagonalized Laplacian operator in the Fourier transform to replace a convolution operator in traditional convolution. A traffic signal X on a traffic flow network diagram G is filtered by a kernel $g_\theta = \text{diag}(U^T g)$, where $U^T g = \hat{g} = (\hat{g}(\lambda_1), \ldots, \hat{g}(\lambda_n))$:

$$x *_G g_\theta = U(U^T x \odot U^T g) = U g_\theta(\Lambda) U^T x;$$

where a graph convolution operation in the above equation requires eigenvalue decomposition of the Laplacian matrix, and computational complexity is $O(n^2)$, which can be challenging when encountering large scale graph data with a very large quantity of nodes. However, the problem is effectively resolved by using a Chebyshev polynomial as a convolution kernel.

In Chebyshev polynomial approximation, in order to localize a filter and reduce a quantity of parameters, a kernel $g_\theta$ can be limited to a polynomial of $\Lambda$, such as $g_\theta(\Lambda) = \Sigma_{k=0}^{k=k-1} \theta_k \Lambda^k$, the kernel may be approximately regarded as $g_\theta(\Lambda) = \Sigma_{k=0}^{k=k-1} \theta_k T_k(\hat{\Lambda})$ by using the Chebyshev polynomial approximation, and after introduction of the Chebyshev polynomial, the graph convolution is rewritten as:

$$x *_G g_\theta = U g_\theta(\Lambda) U^T x = U \Sigma_{k=0}^{k=k-1} \theta_k T_k(\hat{\Lambda}) U^T x = \Sigma_{k=0}^{k=k-1} \theta_k T_k(\hat{L}) x,$$

where $\theta \in \mathbb{R}^k$ is a coefficient of the polynomial, k is a size of the graph convolution kernel, which determines an order of nodes covered when a target node is convoluted;

$$\hat{L} = \frac{2}{\lambda_{max} - 2} L - I_n,$$

$\lambda_{max}$ is a largest eigenvalue of the Laplacian matrix. Chebyshev graph convolution is a filter in which a weight of a high-frequency signal increases as a value of k increases. However, a higher-order form of the Chebyshev graph convolution is actually a high-pass filter, and a higher-order value increases a weight of a high-frequency feature. In order to resolve this problem, the present disclosure replaces the Chebyshev graph convolution with a low-pass filter, which can increase a weight of a low-frequency signal, and suppress the high-frequency signal. Data processed by low-pass graph convolution is smoother and can avoid interference of high-frequency noise.

Therefore, a flow signal x is converted to:

$$x = \alpha_1 \overline{u_1} + \ldots + \alpha_n \overline{u_n};$$

and based on the Laplacian matrix symmetric positive semidefinite matrix, the following may be obtained:

$$\overline{u_i u_i}^T = 1 \text{ and } \overline{u_i u_j}^T = 0;$$

with $U g_\theta(\Lambda) U^T x = (\theta_1 \overline{u_1 u_1}^T + \ldots, \theta_n \overline{u_n u_n}^T) x$ in formula (1), the following can be obtained $$\overline{u_n u_n}^T x = \alpha_1 \overline{u_1 u_1}^T \overline{u_1} + \ldots, + \alpha_n \overline{u_n u_n}^T \overline{u_n} = \alpha_n \overline{u_n};$$

and in this case, $\{\overline{u_n u_n}^T\}_{n=1}^n$ is a set of basic filters in the graph convolution, which only allows eigenvalues related to $\overline{u_n}$ to pass through, and $\alpha_n$ is equivalent to a weight assigned to the filter. In the Chebyshev polynomial graph convolution, there is one set of combined filters $\{\hat{L}^k\}_{k=0}^{k-1}$, then for the basic filter of the Chebyshev graph convolution, a basic filter of a high-frequency signal gains a greater weight, $\alpha_n = \lambda_n^k$.

In this embodiment, the low-pass graph convolutional block increases a weight of a low-frequency signal and suppresses a high-frequency signal by using the low-pass filter, and the low-pass filter is defined as:

$$f(\lambda_i) = 1 - \frac{1}{2} \lambda_i,$$

where $\lambda_i$ is an $i^{th}$ feature value;

a graph convolution operation of the low-pass graph convolutional block is:

$$x *_G g_\theta = U \Sigma_{k=0}^{k-1} \theta_k (\Lambda_s)^k U^T x = \left\{ \theta_0 I + \theta_1 \left( \left(1 - \frac{1}{2}\lambda_1\right) \overline{u_1 u_1}^T + \ldots \left(1 - \frac{1}{2}\lambda_n\right) \overline{u_n u_n}^T + \ldots + \theta_{k-1} \left( \left(1 - \frac{1}{2}\lambda_1^{k-1}\right) \overline{u_1 u_1}^T + \ldots + \left(1 - \frac{1}{2}\lambda_n\right)^{k-1} \overline{u_n u_n}^T \right) \right\} x =$$

$$\theta_0 I + \theta_1 \left(I - \frac{1}{2}L\right) + \ldots + \theta_{k-1}\left(I - \frac{1}{2}L\right)^{k-1},$$

where $$\Lambda_s = \text{diag}\left(\left\{1 - \frac{1}{2}\lambda_i\right\}_{i=1}^n\right)$$

indicates a diagonal matrix filtered by the low-pass filter, a convolution kernel of graph convolution is $g_\theta = \Sigma_{k=0}^{k-1} \theta_k (\Lambda_y)^k$; $u_i u_i^T = 1$, $\overline{u_i u_j}^T = 0$, $i \neq j$, $(\overline{u_1}, \ldots, \overline{u_n}) = U$, and U indicates eigenvectors of a Laplacian matrix; $\theta \in \mathbb{R}^k$ is a coefficient of a polynomial; k is a size of a graph convolution kernel; x is a flow signal on the traffic flow network diagram G; L is the Laplacian matrix, $L = D - A$, $D \in \mathbb{R}^{N \times N}$ is a diagonal matrix indicating a sum of weights of all edges starting from the node i; and I is a constant, and A is an adjacency matrix.

The low-pass graph convolution of the present disclosure can assign a higher weight to a low-frequency signal, but does not give up a feature of a high-frequency signal, so that a traffic feature on the traffic flow network diagram can be better obtained without missing a traffic feature of the high-frequency signal.

In this embodiment, the causal gated linear unit captures the temporal feature by exploring a $k_t$ order neighborhood of each node on a traffic flow network diagram G, each convolution shortens a temporal length of $k_t - 1$, i node data is regarded as data $Y \in \mathbb{R}^{N \times \tau \times C_i}$ with a slice temporal length of $\tau$ and a channel quantity of $C_i$, and the convolution kernel is defined as $\Gamma \in \mathbb{R}^{1 \times C_i \times 2C_0}$, and a first causal gated linear unit performs one-dimensional causal convolution, a second causal gated linear unit performs one-dimensional causal convolution and then performs a nonlinear change, data output of the two parts is recorded as $[P,Q] \in \mathbb{R}^{N \times (M - k_t + 1) \times 2C_0}$, and finally hadamard product is performed on the data of the two parts, to obtain convolution of the causal gated linear unit:

$$\Gamma *_T Y = P \odot \text{sigmoid}(Q) \in \mathbb{R}^{N \times (\tau - k_t + 1) \times C_0},$$

where $\mathbb{R}$ is a matrix; N is that data is split into N parts; $C_0$ is a traffic flow feature dimension; and f is low-pass filtering.

Since the traffic flow network diagram is defined as an undirected graph, after feature extraction and fusion by the causal gated-low-pass convolution block, a temporal-spatial feature is $x_{t-1} \in \mathbb{R}^{(\tau - k_t + 1) \times N \times C_i}$, and the prediction result output by the fully-connected layer is:

$$\text{out} = \text{Relu}(\Gamma_1 *_T(\text{Relu}((\Gamma_0 *_T x_t) *_G g_\theta))),$$

where $\Gamma_0$ is a convolutional kernel of a convolution module of the first causal gated linear unit; $\Gamma_1$ is a convolutional kernel of a convolution module of the second causal gated linear unit; $g_\theta$ is a convolution kernel of the low-pass graph convolutional block, and Relu is an activation function of the low-pass graph convolutional block and the fully-connected layer; *f indicates an operation of the causal gated linear unit, and *G indicates an operation of the low-pass graph convolutional block.

In order to evaluate model performance, a comparative experiment is conducted on two real traffic network flow datasets.

This embodiment validates a convolutional network of the present disclosure on two highway traffic datasets, PeMS04 and PeMS08, collected in California. The two datasets are collected by the Caltrans Performance Measurement System (PeMS) every 30 seconds in real time. Flow data is aggregated at 5-minute intervals. The system deploys more than 45, 514 detectors along highways in major metropolitan areas of California. The data sets contain three traffic measurement methods, which are flow, occupancy, and speed. We selected data of California's fourth and eighth districts as the datasets.

PeMS04 is traffic data in the San Francisco Bay Area. This dataset is composed of 3848 detectors covering 29 streets in the area. From January to February 2018, a total of 59 days, collected every 30 seconds and aggregated every five minutes. We select the first 45 days of the data as a training set and the remaining data as a test set.

PeMS08 is traffic data of San Bernardino, the data set is composed of 1979 detectors covering 8 streets in the area, from July to August 2016, a total of 62 days, collected every 30 seconds and aggregated every five minutes. The first 48 days of the data is selected as a training set and the remaining data is selected as a test set.

To ensure that each detector represents an intersection and that a distance between detectors is not less than 3.5 miles, redundant detectors are removed. Finally, 307 detectors are reserved for PeMS04 and 170 detectors for PeMS08. These detectors aggregate intersection traffic flow data every five minutes. Therefore, 288 data points are collected per intersection per day, and a missing value is filled by linear interpolation. In addition, data is normalized by zero mean so that an average value is zero.

This experiment uses a pytorch framework to build the convolutional network of the present disclosure. In the experiment, an order $k \in [0,1,2,]$ of a low-pass graph convolution module is tested. An experimental result shows that when k=2, an excellent effect is achieved, and a convolution kernel size is set to 3. In terms of data, a concept of "sliding window" is used to divide data. In the low-pass graph convolution module, a spatial axis is convolved based on a temporal axis slice. The "sliding window" is to use a traffic flow of previous 0~τ time points to predict a traffic flow at a $\tau+1_{th}$ time point. The τ+1 pieces of data constitute a sample in the training set, and the τ pieces of data are input x, and $\tau+1_{th}$ data is a label ŷ. The next sample is to move the "sliding window" to a time point, and use a traffic flow of 1~τ+1 time points to form new input data x, and a traffic flow at a $\tau+2_{th}$ time point is a new label ŷ. These data and labels constitute the training and testing sets. The "Sliding window" uses an average value of multiple data to perform prediction, avoiding outliers and differences generated by single data, minimizing impact on a prediction result, and making data more stable. A size of the "sliding window" in the present disclosure is set to τ=12, and a prediction range can be arbitrarily selected from a list of continuous time nodes. A prediction range of the present disclosure is set to five minutes, 15 minutes, 30 minutes, and 45 minutes, including two landmark time points of short-term and long-term prediction, respectively.

In this experiment, a mean absolute error (MAE) and a root mean square error (RMSE) are used as evaluation indicators and baselines to measure and evaluate performance of different methods. The following classic methods are used for comparison: (1). Historical average (HA); (2). Autoregressive Integrated Moving Average Method (ARIMA); (3). Vector Autoregression (VAR); (4). Long Short-Term Memory Network (LSTM); and (5). Gated Recurrent Unit Network (GRU). Table 1 shows performance comparison of different methods for the PeMS04 dataset and the PeMS08 dataset.

TABLE 1

| | PeMS04(5/15/30/45 min) | | PeMS08(5/15/30/45 min) | | |
|---|---|---|---|---|---|
| Model | MAE | RMSE | Model | MAE | RMSE |
| HA | 35.12/35.75/ 36.89/37.25 | 41.25/44.97/ 52.87/54.89 | HA | 26.98/27.77/ 28.45/29.12 | 32.87/35.31/ 42.08/47.29 |
| ARIMA | 30.06/30.56/ 31.95/32.63 | 33.12/43.98/ 59.87/65.73 | ARIMA | 21.43/22.02/ 22.98/23.87 | 22.47/29.15/ 39.21/48.34 |
| VAR | 30.58/31.72/ 32.69/33.52 | 46.29/49.92/ 52.87/54.89 | VAR | 19.19/19.56/ 20.35/21.12 | 22.12/26.93/ 31.45/35.91 |
| LSTM | 27.57/28.03/ 28.65/29.15 | 34.05/37.72/ 44.89/47.01 | LSTM | 21.41/21.85/ 22.45/23.21 | 21.32/27.73/ 36.78/42.51 |
| GRU | 26.41/27.08/ 28.23/29.12 | 34.12/37.59/ 45.12/46.85 | GRU | 19.52/19.98/ 20.82/22.46 | 21.39/26.69/ 37.83/43.28 |
| CGGCN | 23.15/24.08/ 25.23/26.12 | 32.12/33.49/ 35.15/37.90 | CGGCN | 17.52/17.98/ 18.84/20.46 | 21.15/22.49/ 24.15/25.85 |
| CGLGCN | 22.12/22.94/ 23.51/24.24 | 31.23/32.45/ 34.05/35.91 | CGLGCN | 16.41/170.1/ 17.74/18.84 | 20.28/21.87/ 23.29/24.89 |

It can be seen from Table 1 that the CGLGCN (causal gated-low-pass graph convolution network) of the present disclosure achieves best results in all performance indicators after experiments on the two data sets. It can be observed that prediction results of traditional temporal analysis methods are usually not ideal, indicating that these methods are not effective in modeling nonlinear and complex flow data. In contrast, methods based on deep learning basically achieve better prediction results than the traditional temporal analysis methods. However, the causal gated-low-pass graph convolutional network of the present disclosure can obtain better prediction results than LSTM and GRU models that only consider a temporal correlation, and further reduce a prediction error, because both temporal and spatial correlations are considered.

Figure 3:
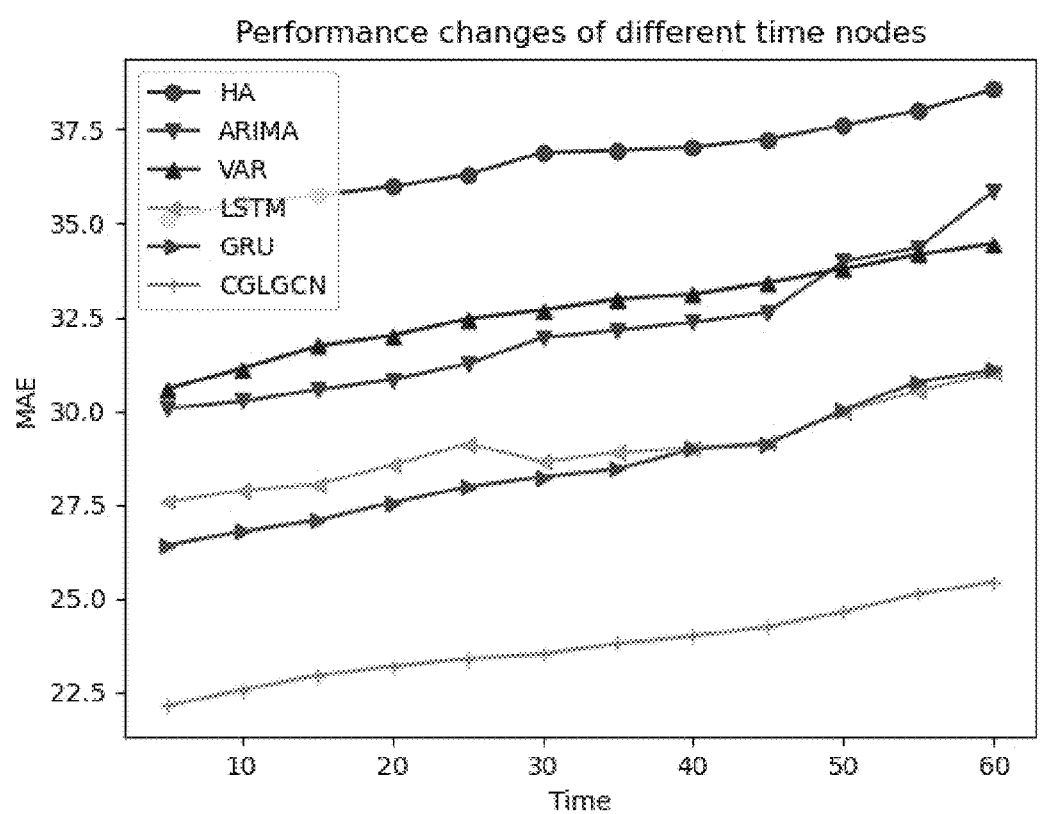
FIG. 3 shows a change diagram of a mean absolute error (MAE) of each model with increasing time in a PeMS04 dataset.
Figure 4:
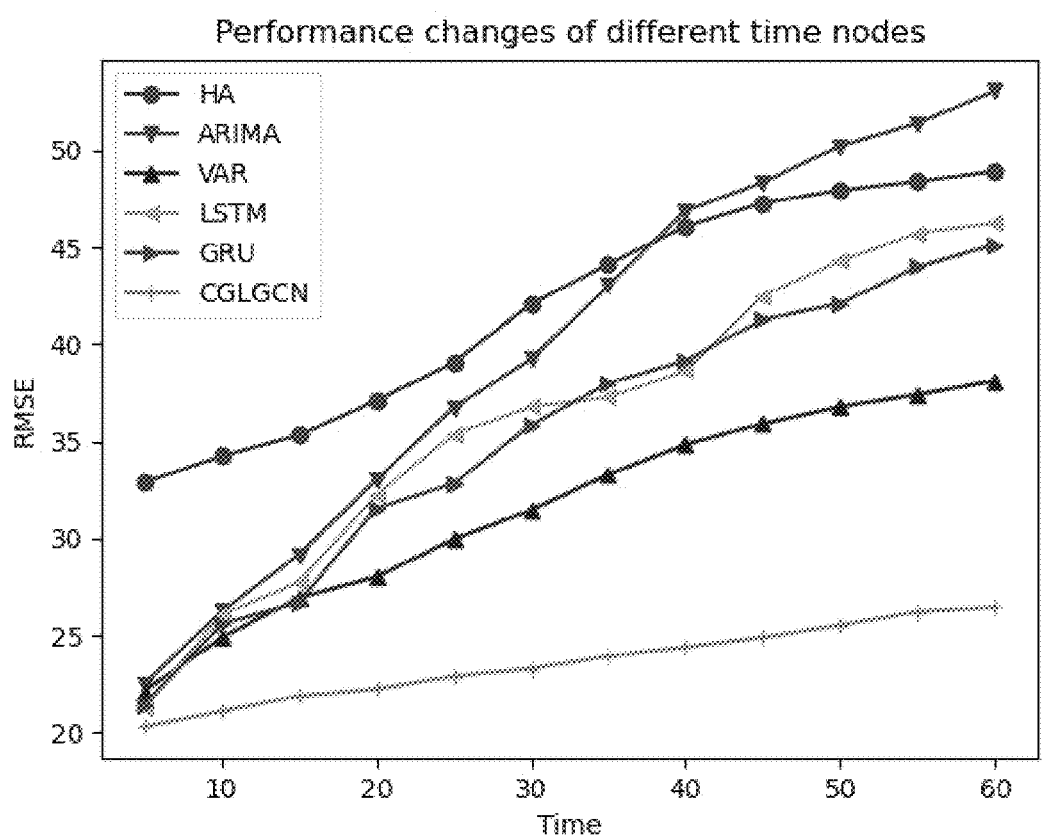
FIG. 4 shows a change diagram of a root mean square error (RMSE) of each model with increasing time in a PeMS04 dataset.
Figure 5:
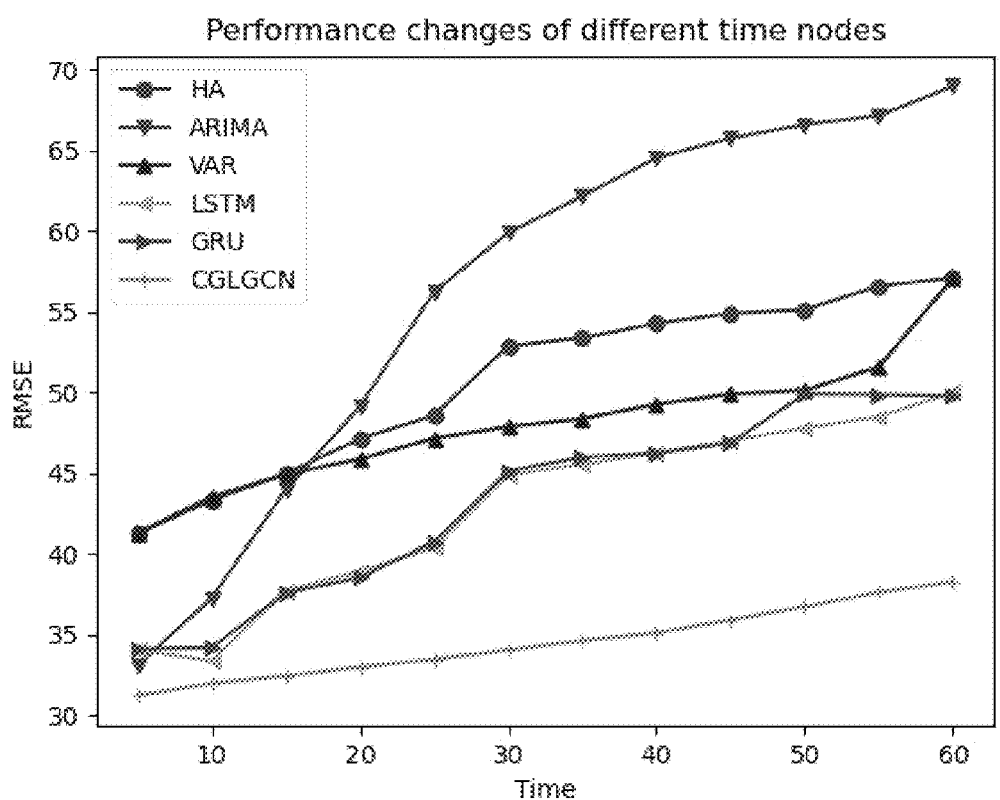
FIG. 5 shows a change diagram of a mean absolute error (MAE) of each model with increasing time in a PeMS08 dataset.
Figure 6:
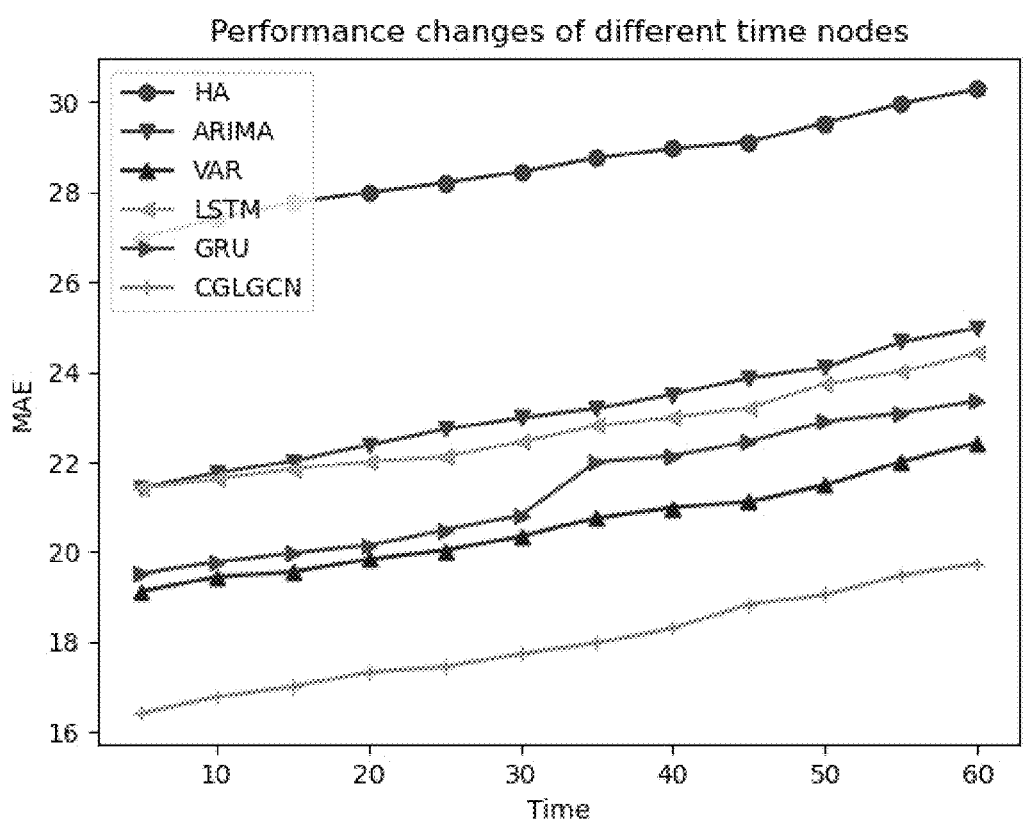
FIG. 6 shows a change diagram of a root mean square error (RMSE) of each model with increasing time in a PeMS08 dataset.

FIG. 3 and FIG. 4 show change diagrams of a mean absolute error (MAE) and a root mean square error (RMSE)

of each network or model with increasing time in a PeMS04 dataset. FIG. 5 and FIG. 6 show change diagrams of a mean absolute error (MAE) and a root mean square error (RMSE) of each network model with increasing time in a PeMS08 dataset. As can be seen from FIG. 3 to FIG. 6, a larger time span indicates lower accuracy of model prediction. The models ARIMA, LSTM, and GRU, which only consider a temporal correlation, almost achieve excellent performance in short-term 5-minute traffic flow prediction, but as a prediction temporal lengthens, performance of these types of model declines sharply. The VAR model considering temporal and spatial correlations is relatively stable, but VAR shows significant differences in different sample magnitudes. With expansion of a road network scale, performance of VAR also declines severely. Although VAR considers the temporal and spatial correlations, it is not suitable for traffic flow prediction of a large-scale road network. However, the CGLGCN model of the present disclosure always maintains good performance in the test, whether it is a large-scale road network or a small-scale road network, and can still maintain sufficiently stable performance as a prediction time lengthens.

Figure 7:
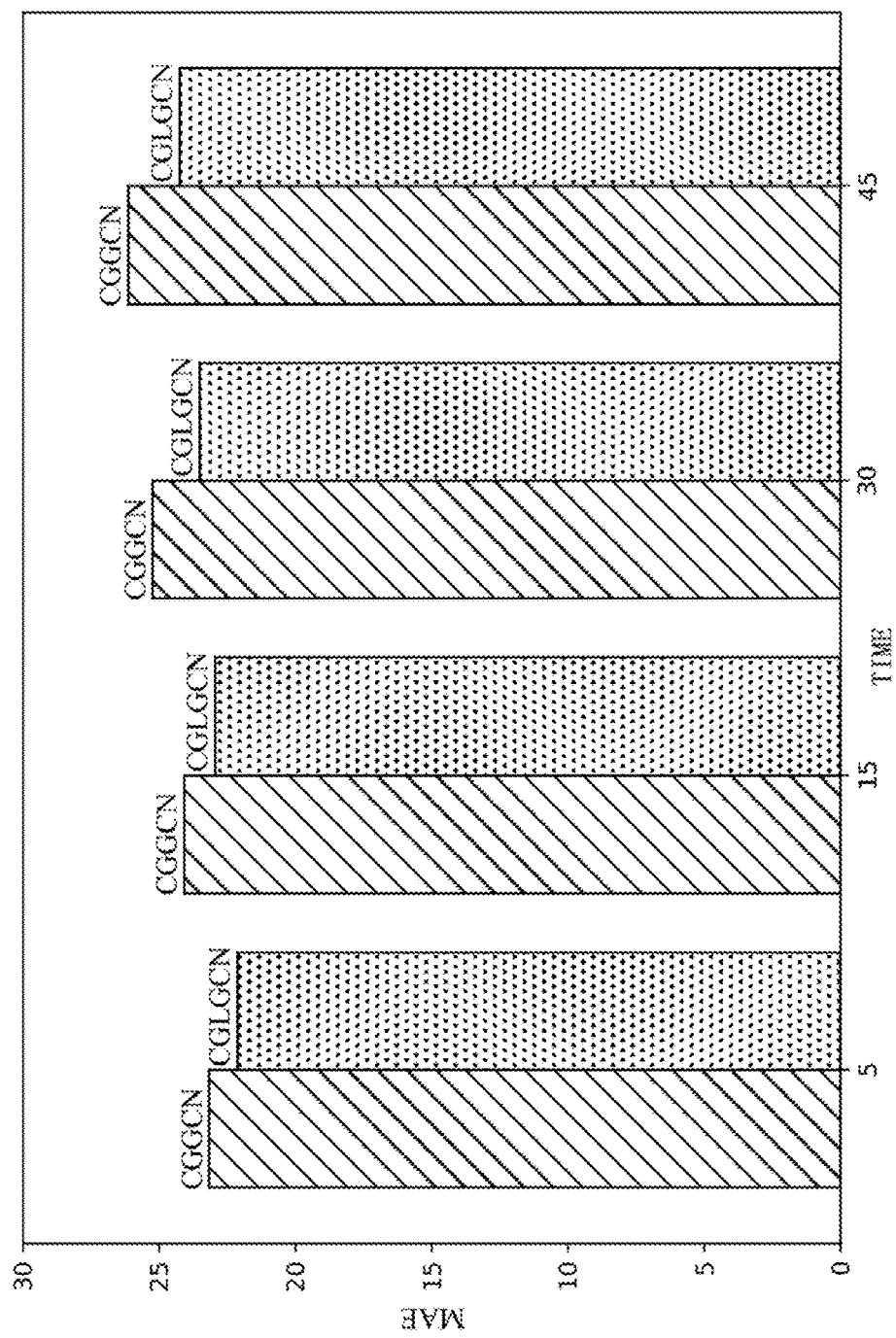
FIG. 7 shows changes of a mean absolute error (MAE) of a model of the present disclosure (CGLGCN) and that of a CGGCN model in an ablation experiment with increasing time in a PeMS04 data set.
Figure 8:
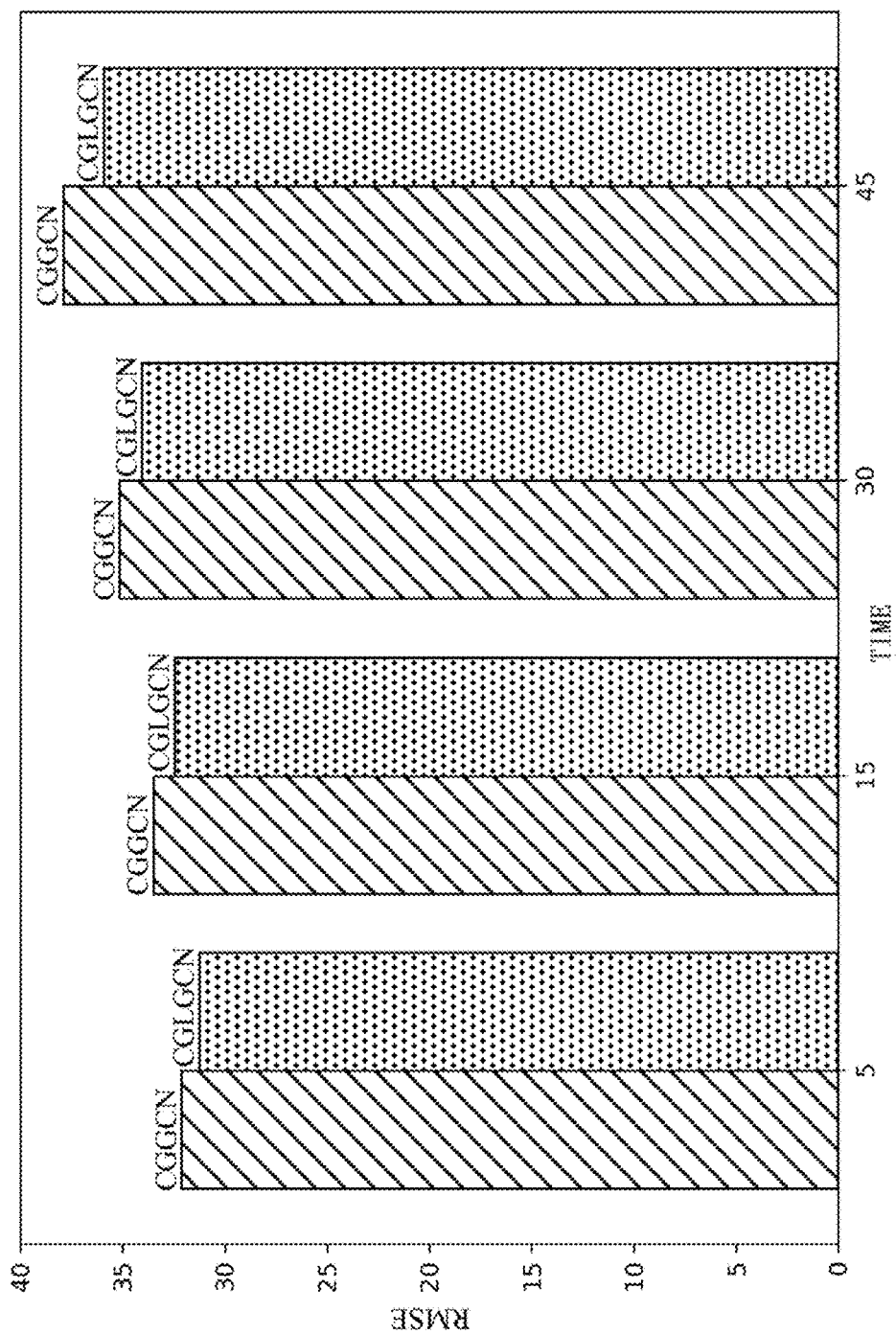
FIG. 8 shows changes of a root mean square error (RMSE) of a model of the present disclosure (CGLGCN) and that of a CGGCN model in an ablation experiment with increasing time in a PeMS04 data set.
Figure 9:
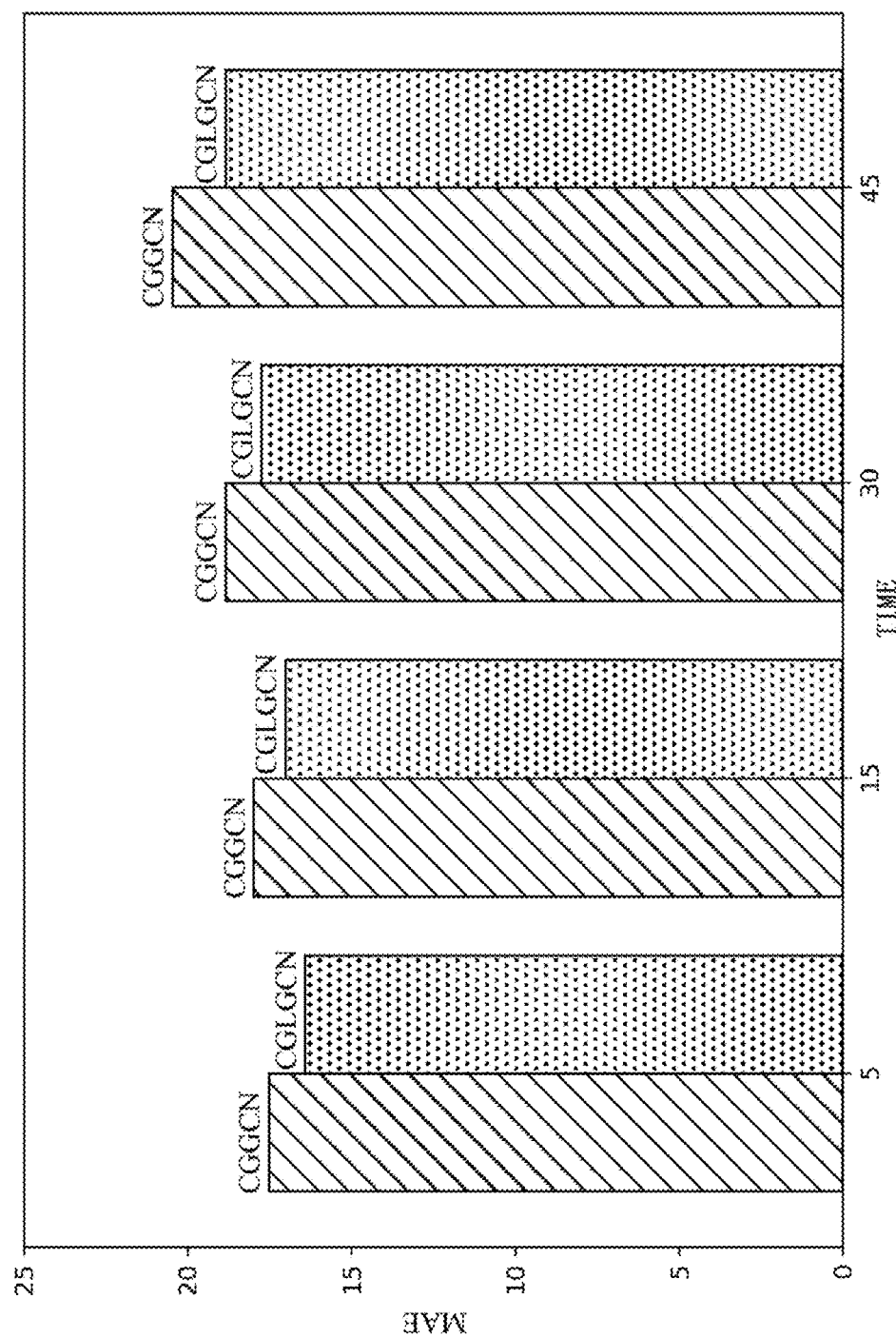
FIG. 9 shows changes of a mean absolute error (MAE) of a model of the present disclosure (CGLGCN) and that of a CGGCN model in an ablation experiment with increasing time in a PeMS08 data set.
Figure 10:
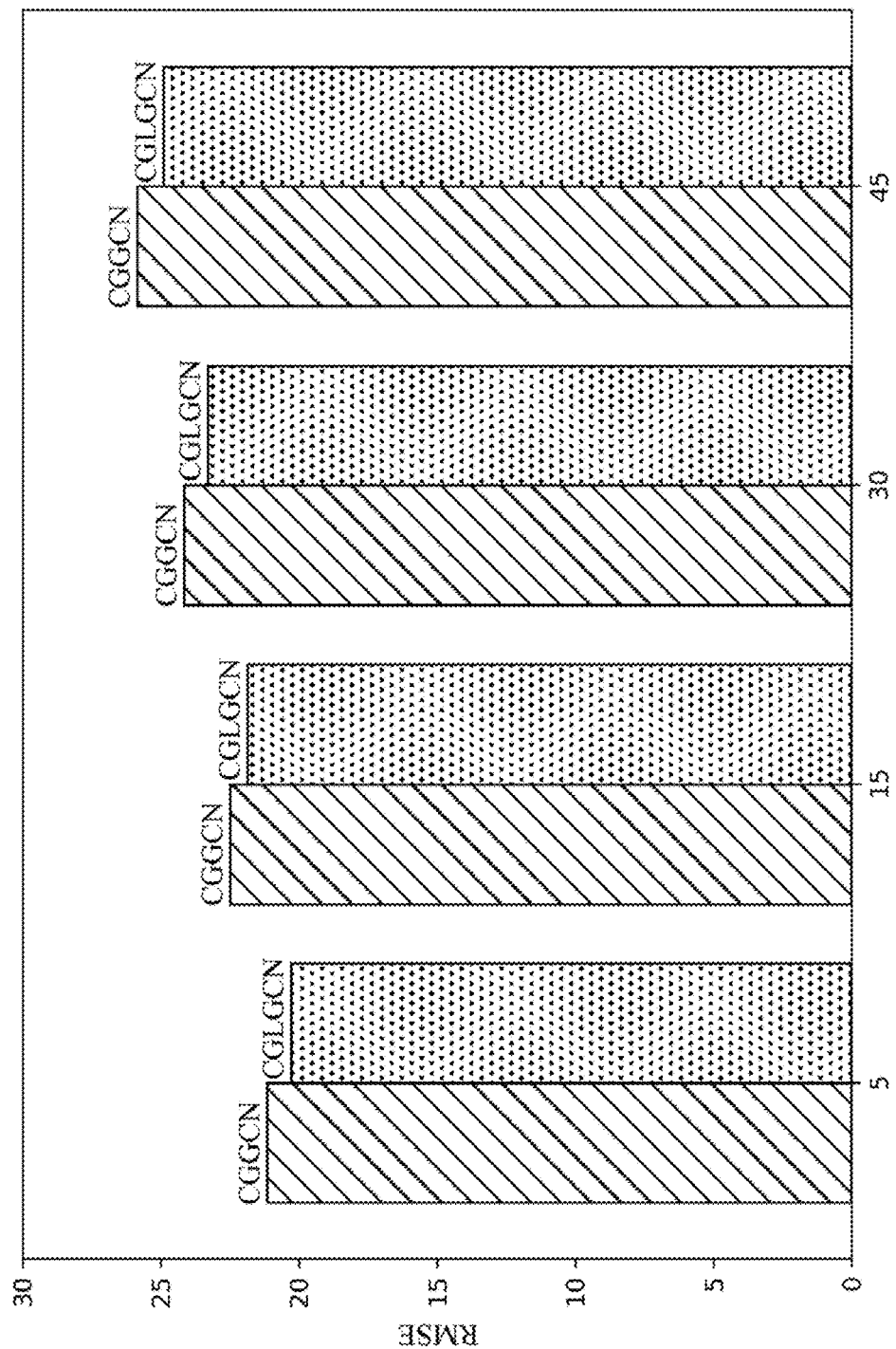
FIG. 10 shows changes of a root mean square error (RMSE) of a model of the present disclosure (CGLGCN) and that of a CGGCN model in an ablation experiment with increasing time in a PeMS08 data set.

In this experiment, a model that does not use a low-pass filtering constraint is named CGGCN. CGGCN and the model of the present disclosure are used to perform ablation experiments on CGLGCN on the pems04 and pems08 data sets, respectively. FIG. 7 shows changes of a mean absolute error (MAE) of a model of the present disclosure (CGLGCN) and that of a CGGCN model in an ablation experiment with increasing time in a PeMS04 data set. FIG. 8 shows changes of a root mean square error (RMSE) of a model of the present disclosure (CGLGCN) and that of a CGGCN model in an ablation experiment with increasing time in a PeMS04 data set. FIG. 9 shows a change diagram of a mean absolute error (MAE) of a model of the present disclosure (CGLGCN) and that of a CGGCN model in an ablation experiment with increasing time in a PeMS08 data set. FIG. 10 shows a change diagram of a root mean square error (RMSE) of a model of the present disclosure (CGLGCN) and that of a CGGCN model in an ablation experiment with increasing time in a PeMS08 data set. The experiments show that the model of the present disclosure has better performance, which proves feasibility of a low-pass filter constraint of the present disclosure.

TABLE 2

| Data set | 1000 time consumption (s) | | |
| --- | --- | --- | --- |
|  | LSTM | GRU | CGLGCN |
| PeMS04 | 21844.54 | 17973.62 | 2579.79 |
| PeMS08 | 10000.15 | 7589.26 | 1279.83 |

Figure 11:
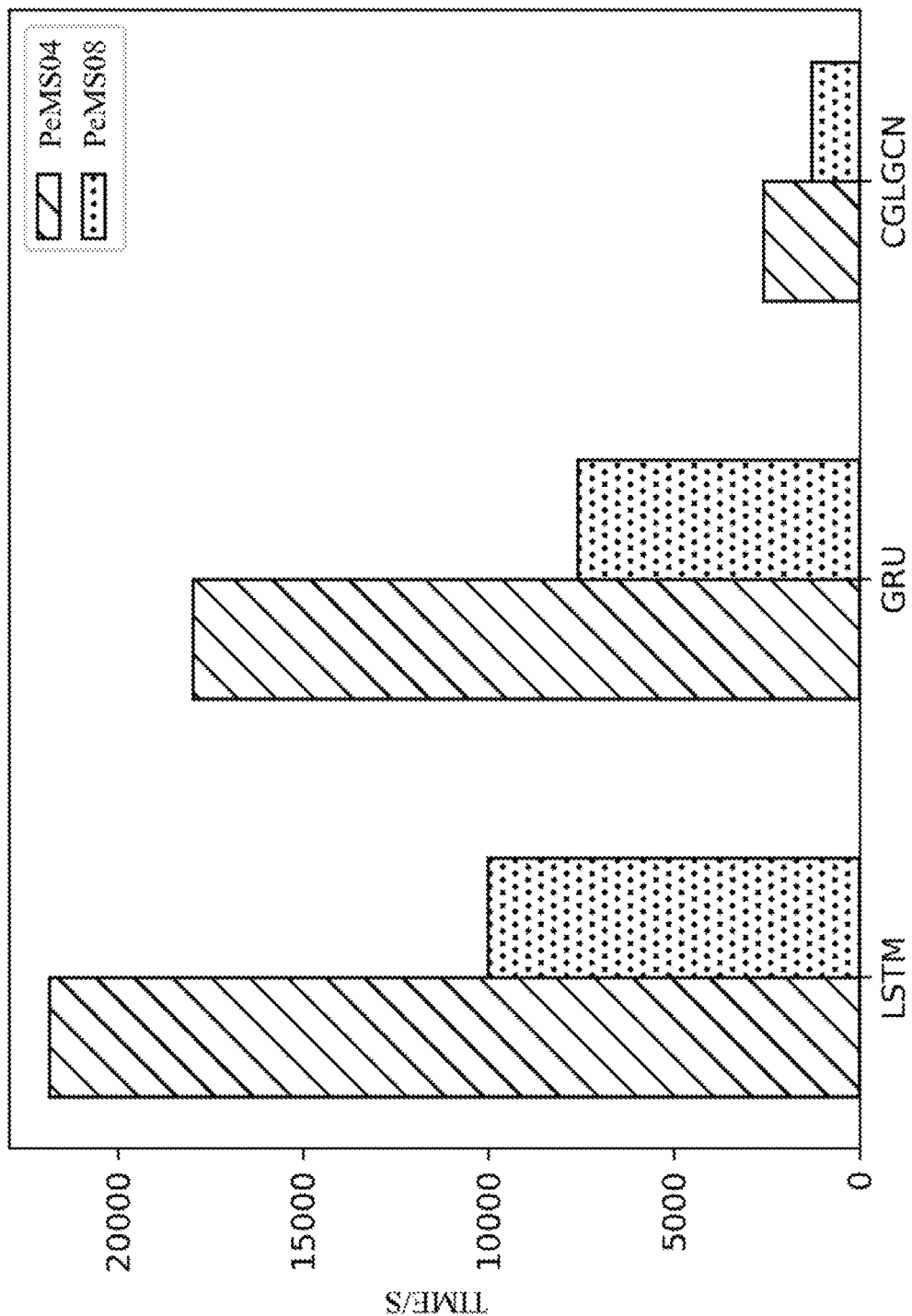
FIG. 11 is a schematic diagram of training time comparison of each model.

The model of the present disclosure discards LSTM and GRU models with large parameter and time consumption, and captures a feature in a temporal dimension by using a gated linear unit, thus greatly reducing a training time. As shown in FIG. 11 and Table 2, the CGLGCN model of the present disclosure only uses 2579.79 seconds and 1279.83 seconds in 1000 rounds of training of the pems04 dataset and the pems08 dataset, while the LSTM model uses 21844.54 seconds and 17973.62 seconds, and the GRU model uses 10000.15 seconds and 7589.26 seconds.

Figure 12:
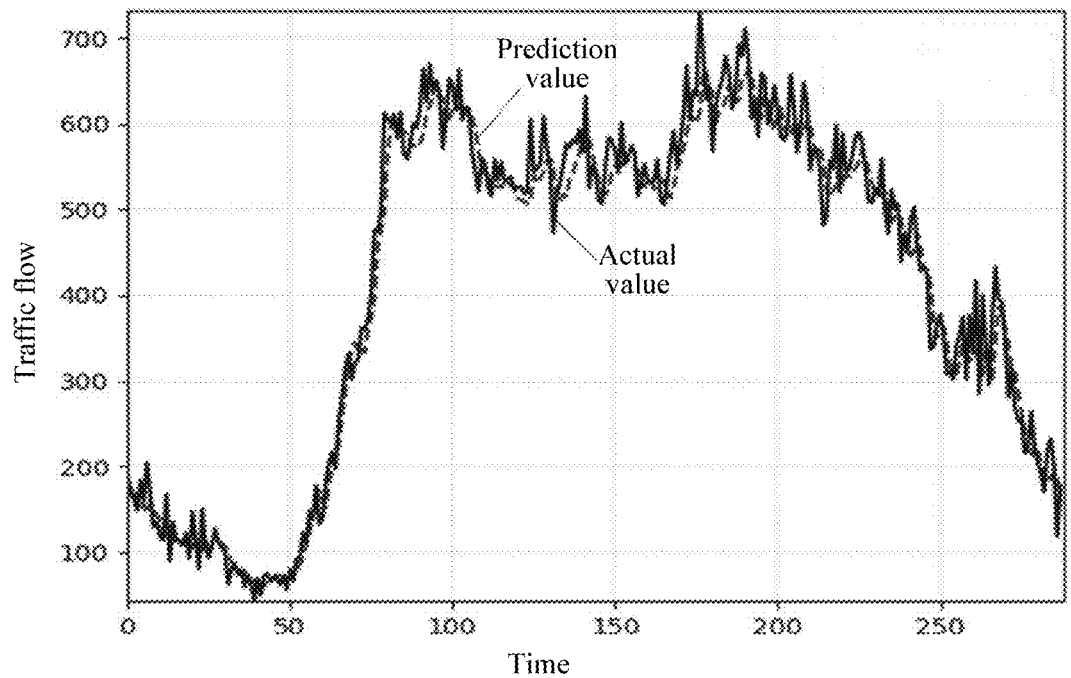
FIG. 12 is a fitting diagram of traffic flow prediction values of a model of the present disclosure and actual values from 00:00 AM to 24:00 PM in a PeMS04 dataset.
Figure 13:
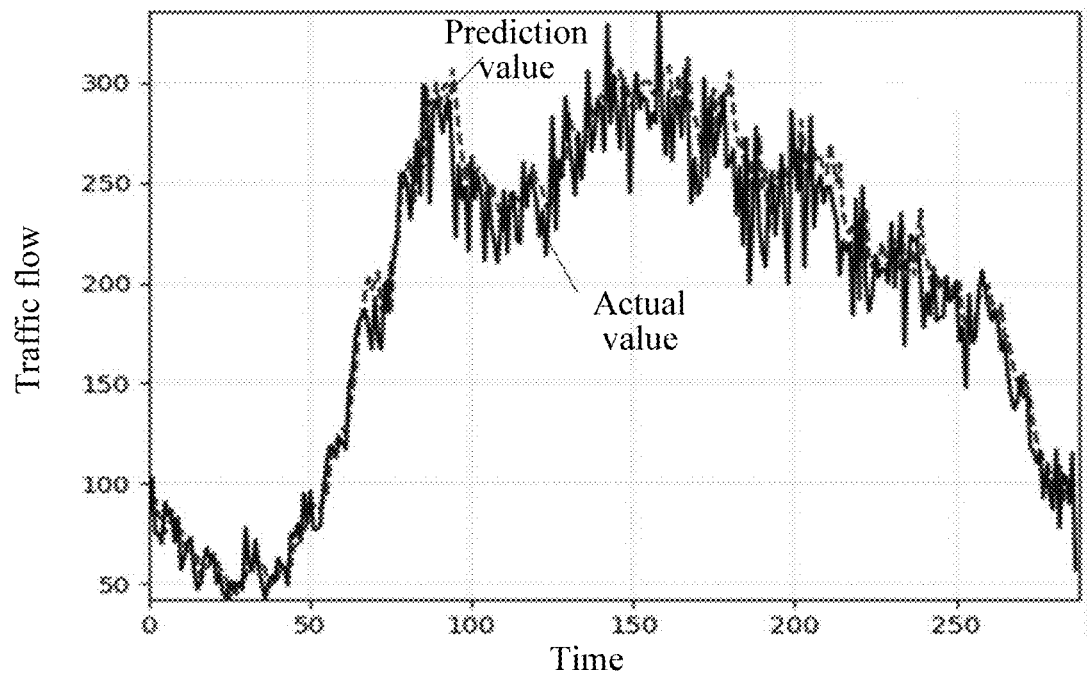
FIG. 13 is a fitting diagram of traffic flow prediction values of a model of the present disclosure and actual values from 00:00 AM to 24:00 PM in a PeMS08 dataset.

In order to verify stability of the model of the present disclosure, a 24-hour traffic flow is predicted. FIG. 12 is a fitting diagram of traffic flow prediction values of a model of the present disclosure and actual values from 00:00 AM to 24:00 PM in a PeMS04 dataset. FIG. 13 is a fitting diagram of traffic flow prediction values of a model of the present disclosure and actual values from 00:00 AM to 24:00 PM in a PeMS08 dataset. A scale of the x-coordinate in FIG. 12 and FIG. 13 indicates flow prediction collected at 288 time points every five minutes from 0:00 to 24:00 of a day. It can be seen from the figure that the model of the present disclosure is very consistent with a traffic flow variation trend predicted by the model of the present disclosure. It can be seen that the model of the present disclosure can accurately predict the traffic flow of each time period at each intersection, which fully proves stability of the model of the present disclosure.

In summary, the present disclosure forms a prediction model by using the causal gated-low-pass convolution block and the fully-connected output layer, captures the spatial feature in the traffic flow network diagram by using the graph convolutional block, and at the same time, in order to avoid influence of the high weight of the high-frequency information, the low-pass pass filter that can both suppress the high-frequency information and enhance the low-frequency information is added to graph convolution, so that a signal on the entire graph is smoother and more robust. Meanwhile, in order to resolve inherent defects of a recurrent network, the present disclosure uses the causal gated linear unit on a temporal axis to capture a temporal feature, and here use of LSTM is avoided, which speeds up training and improves efficiency. Finally, the two parts are combined to extract the temporal and spatial features together. Therefore, the present disclosure can predict short-term traffic flow with high accuracy.

What is claimed is:

1. A short-term traffic flow prediction method based on a causal gated-low-pass graph convolutional network, comprising the following steps:

S1: constructing a causal gated-low-pass graph convolutional network, wherein the causal gated-low-pass graph convolutional network comprises a causal gated-low-pass convolutional block, the causal gated-low-pass convolutional block is connected to a fully-connected output layer, the causal gated-low-pass convolutional block comprises two causal gated linear units and a low-pass graph convolutional block with a low-pass filter, and the low-pass graph convolutional block is set between the causal gated linear units; and S2: obtaining a traffic flow network diagram based on traffic flow data, using the traffic flow network diagram as input, capturing a temporal feature of the traffic flow network diagram by using the causal gated linear unit, capturing a spatial feature in the traffic flow network diagram by using the low-pass graph convolution block, suppressing high-frequency information and enhancing low-frequency information in the spatial feature by using the low-pass filter, then fusing the temporal feature and the spatial feature, and then outputting a prediction result by using the fully-connected layer.

2. The short-term traffic flow prediction method based on a causal gated-low-pass graph convolutional network according to the claim 1, wherein the causal gated linear unit consists of causal convolution, dilated convolution, and residual connection; the causal convolution is responsible for extracting a temporal feature, and performing convolution by using a one-dimensional convolution kernel, a size of the convolution kernel is 2, and each convolution stride is 1; the dilated convolution is a convolution manner with a stride of at least 2, which improves a convolution receptive field greatly with a very small data length by using a plurality of hidden layers, and reduces temporal consumption of causal convolution; and the residual connection is used to alleviate a gradient vanishing problem and avoid a redundant calculation process.

3. The short-term traffic flow prediction method based on a causal gated-low-pass graph convolutional network according to the claim 2, wherein the causal gated linear unit captures the temporal feature by exploring a $k_t$ order neighborhood of each node on a traffic flow network diagram G, each convolution shortens a temporal length of $k_t-1$, i node data is regarded as data $Y \in \mathbb{R}^{N \times \tau \times C_i}$ with a slice temporal length of $\tau$ and a channel quantity of $C_i$, and the convolution kernel is defined as $\Gamma \in \mathbb{R}^{1 \times C_i \times 2C_0}$, and a first causal gated linear unit performs one-dimensional causal convolution, a second causal gated linear unit performs one-dimensional causal convolution and then performs a nonlinear change, data output of the two parts is recorded as $[P,Q] \in \mathbb{R}^{N \times (M-k_t+1) \times 2C_0}$, and finally hadamard product is performed on the data of the two parts, to obtain convolution of the causal gated linear unit:

$$\Gamma *_f Y = P \odot \text{sigmoid}(Q) \in \mathbb{R}^{N \times (\tau - k_t + 1) \times C_0},$$

wherein $\mathbb{R}$ is a matrix; N is that data is split into N parts; $C_0$ is a traffic flow feature dimension; and f is low-pass filtering.

4. The short-term traffic flow prediction method based on a causal gated-low-pass graph convolutional network according to the claim 3, wherein the traffic flow network diagram is defined as an undirected graph:

$$G_t = \{V_t, E, A\},$$

wherein $G_t$ indicates a traffic flow network diagram at a moment t, $V_t$ indicates a set of nodes of $|V|=n$ at the moment t, E is a set of edges, which indicates connectivity between nodes; $A \in \mathbb{R}^{n \times n}$ is an adjacency matrix, and $A_{i,j}=A_{j,i}$ defines a connection between a node i and a node j; and $x_t^{c,i} \in R$ is used to indicate a value of a feature $C_t$ of the node i at the moment t, $c_t \in (f_t, o_t, s_t)$, and $x_t^i \in \mathbb{R}^T$ indicates values of all features of the node i at the moment t; $f_t$ indicates a traffic flow feature at the moment t on the traffic flow network diagram G; $X_t = (x_t^1, x_t^2, \ldots, x_t^n)^T \in \mathbb{R}^{N \times C_i}$ indicates values of all features of all nodes at the moment t, $X=(X_1, X_2, \ldots, X_\tau)^T \in \mathbb{R}^{\tau \times N \times C_i}$ indicates values of all features of all nodes on a temporal slice $\tau$; $o_t$ is traffic occupancy at the moment t, and $s_t$ is a vehicle speed at the moment t; and $y_t^i = x_t^{f,i}$ is a traffic flow value of any node i at any future moment t.

5. The short-term traffic flow prediction method based on a causal gated-low-pass graph convolutional network according to the claim 4, wherein the low-pass graph convolutional block increases a weight of a low-frequency signal and suppresses a high-frequency signal by using a low-pass filter, and the low-pass filter is defined as:

$$f(\lambda_i) = 1 - \frac{1}{2}\lambda_i,$$

wherein $\lambda_i$ is an $i_{th}$ feature value;
a graph convolution operation of the low-pass graph convolutional block is:

$$x *_G g_\theta =$$
$$U \sum_{k=0}^{k-1} \theta_k (\Lambda_s)^k U^T x = \left\{ \theta_0 I + \theta_1 \left( \left(1 - \frac{1}{2}\lambda_1\right) \overline{u_1 u_1}^T + \ldots \left(1 - \frac{1}{2}\lambda_n\right) \overline{u_n u_n}^T + \right.\right.$$
$$\left.\left. \ldots + \theta_{k-1} \left( \left(1 - \frac{1}{2}\lambda_1^{k-1}\right) \overline{u_1 u_1}^T + \ldots + \left(1 - \frac{1}{2}\lambda_n\right)^{k-1} \overline{u_n u_n}^T \right) \right\} x =$$
$$\theta_0 I + \theta_1 \left( I - \frac{1}{2}L \right) + \ldots + \theta_{k-1} \left( I - \frac{1}{2}L \right)^{k-1},$$

wherein $$\Lambda_s = \text{diag}\left( \left\{ 1 - \frac{1}{2}\lambda_i \right\}_{i=1}^n \right)$$

indicates a diagonal matrix filtered by the low-pass filter, a convolution kernel of graph convolution is $g_\theta = \Sigma_{k=0}^{k-1} \theta_k (\Lambda_g)^k$; $\overline{u_1 u_1}^T = 1$, $\overline{u_i u_j}^T = 0 \cdot i \neq j$, $(\overline{u_1}, \ldots, \overline{u_n}) = U$ and U indicates eigenvectors of a Laplacian matrix; $\theta \in R^k$ is a coefficient of a polynomial; k is a size of a graph convolution kernel; x is a flow signal on the traffic flow network diagram G; L is the Laplacian matrix, $L=D-A$, $D \in \mathbb{R}^{N \times N}$ is a diagonal matrix indicating a sum of weights of all edges starting from the node I; and I is a constant, and A is an adjacency matrix.

6. The short-term traffic flow prediction method based on a causal gated-low-pass graph convolutional network according to the claim 5, wherein after feature extraction and fusion by the causal gated-low-pass convolution block, a temporal-spatial feature is $x_{t+1} \in \mathbb{R}^{(\tau - k_t + 1) \times N \times C_i}$, and the prediction result output by the fully-connected layer is:

$$\text{out} = \text{Relu}(\Gamma_1 *_f (\text{Relu}((\Gamma_0 *_f x_t) *_G g_\theta))),$$

wherein $\Gamma_0$ is a convolutional kernel of a convolution module of the first causal gated linear unit; $\Gamma_1$ is a convolutional kernel of a convolution module of the second causal gated linear unit; $g_\theta$ is a convolution kernel of the low-pass graph convolutional block, and Relu is an activation function of the low-pass graph convolutional block and the fully-connected layer; *f indicates an operation of the causal gated linear unit, and *G indicates an operation of the low-pass graph convolutional block.

\* \* \* \* \*